US012705764B2

(12) United States Patent
Lv et al.

(10) Patent No.: US 12,705,764 B2
(45) Date of Patent: Aug. 11, 2026

(54) ELECTRONIC DEVICE FOR ESTIMATING OPTICAL FLOW AND OPERATING METHOD THEREOF

(71) Applicant: SAMSUNG ELECTRONICS CO., LTD., Suwon-si (KR)

(72) Inventors: Zhaohui Lv, Xi'an (CN); Pei You, Xi'an (CN); Penghui Sun, Xi'an (CN); Feng Zhu, Xi'an (CN); Ran Yang, Xi'an (CN); Huisi Wu, Shenzhen (CN); Wende Xie, Shenzhen (CN); Jingyin Lin, Shenzhen (CN); Zebin Zhao, Shenzhen (CN); Dong Kyung Nam, Suwon-si (KR); Jingu Heo, Suwon-si (KR)

(73) Assignee: SAMSUNG ELECTRONICS CO., LTD., Suwon-si (KR)

( * ) Notice: Subject to any disclaimer, the term of this patent is extended or adjusted under 35 U.S.C. 154(b) by 321 days.

(21) Appl. No.: 18/508,800

(22) Filed: Nov. 14, 2023

(65) Prior Publication Data

US 2024/0161314 A1 May 16, 2024

(30) Foreign Application Priority Data

Nov. 14, 2022 (CN) ........................ 202211424815.3
Oct. 17, 2023 (KR) ........................ 10-2023-0138994

(51) Int. Cl.
*G06T 7/246* (2017.01)
*G06V 10/77* (2022.01)
*G06V 10/80* (2022.01)

(52) U.S. Cl.
CPC .......... *G06T 7/248* (2017.01); *G06V 10/7715* (2022.01); *G06V 10/806* (2022.01)

(58) Field of Classification Search
None
See application file for complete search history.

(56) References Cited

U.S. PATENT DOCUMENTS 11,354,906 B2 * 6/2022 Perazzi .................. G06V 20/46
2020/0302612 A1 * 9/2020 Marrero ................... G06T 7/12
(Continued)

FOREIGN PATENT DOCUMENTS

CN 110853074 A 2/2020
KR 10-2021-0109049 A 9/2021

OTHER PUBLICATIONS

Chen et al., "DR-TANet: Dynamic Receptive Temporal Attention Network for Street Scene Change Detection," arXiv:2103.00879v2 [cs.CV] May 28, 2021 (Year: 2021).*
(Continued)

*Primary Examiner* — Soo Shin
(74) *Attorney, Agent, or Firm* — Sughrue Mion, PLLC

(57) ABSTRACT

A method of estimating an optical flow includes processing, using an image processing pass, a first image and a second image separately, and estimating the optical flow based on a second image attention feature map of the first image and a second image attention feature map of the second image. The processing using the image processing pass includes extracting a feature map by encoding an image, outputting a first image fusion attention feature map by fusing row relationship information of the image with the image feature map, outputting a first image attention feature map of the image based on the first image fusion attention feature map and the image feature map, outputting a second image fusion attention feature map by fusing column relationship information of the image with the first image attention feature map, and generating a second image attention feature map of
(Continued)

the image based on the second image fusion attention feature map and the first image attention feature map.

20 Claims, 10 Drawing Sheets

(56) References Cited

U.S. PATENT DOCUMENTS

| | | | | |
|---|---|---|---|---|
| 2021/0150728 | A1* | 5/2021 | Ahmed | G06V 10/82 |
| 2021/0241470 | A1* | 8/2021 | Tang | G06V 10/443 |
| 2021/0243383 | A1* | 8/2021 | Huang | G06V 10/806 |
| 2021/0279840 | A1* | 9/2021 | Chi | G06T 7/251 |
| 2022/0156944 | A1* | 5/2022 | Zhang | G06F 16/71 |

OTHER PUBLICATIONS

Zhao et al., “Global Matching with Overlapping Attention for Optical Flow Estimation”, 2022 IEEE/CVF Conference on Computer Vision and Pattern Recognition (CVPR), IEEE, Sep. 27, 2022, pp. 17952-17601, doi:10.1109/CVPR52688.2022.01707.
Chen et al., “DR-TANet: Dynamic Receptive Temporal Attention Network for Street Scene Change Detection”, May 28, 2021, 8 total pages, arXiv:2103.00879v2.

* cited by examiner

ELECTRONIC DEVICE FOR ESTIMATING OPTICAL FLOW AND OPERATING METHOD THEREOF

CROSS-REFERENCE TO RELATED APPLICATIONS

This application claims benefit of priority under 35 U.S.C. § 119 to Chinese Patent Application No. 202211424815.3, filed on Nov. 14, 2022, in the China National Intellectual Property Administration, and to Korean Patent Application No. 10-2023-0138994, filed on Oct. 17, 2023, in the Korean Intellectual Property Office, the disclosures of which are incorporated by reference herein in their entireties.

BACKGROUND

1. Field

The present disclosure relates generally to electronic devices, and more particularly, to methods and apparatuses for estimating an optical flow and an operating method thereof.

2. Description of Related Art

Optical flows may play an important role in computer vision. For example, an optical flow may contain information about a potential movement of an object. As such, optical flows may be used in computer vision applications, such as, but not limited to, video target detection, target segmentation, action recognition, target tracking, robot navigation, shape information recovery, and the like.

Related optical flow estimation methods may extract a large amount of context features using a transformer. Alternatively or additionally, the related optical flow estimation methods may attempt to reduce local blur in optical flow prediction due to scenes (e.g., repetitive texture, texture-less area, large displacement, and occlusion) that may be present in an image. However, the transformer may cause a considerable amount of computation and/or memory consumption. Typical application scenarios of optical flow estimation may focus on terminal devices with limited resources. Thus, balancing the amount of computation and/or memory resources with an optical flow estimation accuracy may be needed.

To reduce the amount of computation, a feature map of an image may be optimized through an axially separated attention mechanism. For example, one-dimensional standard multi-head self-attention (MSA) layers may be set respectively for the width-axis and height-axis of the image. In such an example, the two axial attention layers may respectively perform attention operations along the width-axis and height-axis. As another example, an attention operation system (e.g., an attention operation system through an axially separated attention mechanism) may potentially reduce the amount of computation. However, image features updated by an attention operation system may be orthogonal. As a result, attentions of rows (and/or columns) in the width-axial (and/or height-axial) direction may be independent of each other. These independent features may be disadvantageous to obtaining global context information. Thus, the attention operation system may lower the accuracy of optical flow estimation.

SUMMARY

One or more aspects of the present disclosure may address at least the above problems and/or disadvantages and other disadvantages not described above. Alternatively or additionally, one or more aspects of the present disclosure may not overcome the disadvantages described above, and/or an aspect may not overcome any of the problems described above.

One or more aspects of the present disclosure may provide a method and apparatus for estimating an optical flow for a storage device that may improve the accuracy of optical flow estimation and improve the efficiency of optical flow estimation by reducing the amount of computation.

The technical goals to be achieved may not limited to those described above, and other technical goals not mentioned above may be clearly understood by one of ordinary skill in the art from the following description.

According to an aspect of the present disclosure, a method of estimating an optical flow includes processing, using an image processing pass, a first image and a second image separately, and estimating the optical flow based on a second image attention feature map of the first image processed using the image processing pass and a second image attention feature map of the second image processed using the image processing pass. The processing of an image using the image processing pass includes: extracting an image feature map of the image by encoding the image, outputting a first image fusion attention feature map by fusing image width-axial row relationship information of the image with the image feature map, outputting a first image attention feature map of the image based on the first image fusion attention feature map and the image feature map, outputting a second image fusion attention feature map by fusing image height-axial column relationship information of the image with the first image attention feature map, and generating a second image attention feature map of the image based on the second image fusion attention feature map and the first image attention feature map.

According to an aspect of the present disclosure, am apparatus for estimating an optical flow includes a memory configured to store one or more instructions, and a processor communicatively coupled to the memory. The processor is configured to execute the one or more instructions to process, using an image processing pass, a first image and a second image separately, and estimate the optical flow based on a second image attention feature map of the first image obtained using the image processing pass and a second image attention feature map of the second image obtained using the image processing pass. The image processing pass is configured to extract an image feature map of an image by encoding the image, output a first image fusion attention feature map by fusing image width-axial row relationship information of the image with the image feature map, output a first image attention feature map of the image based on the first image fusion attention feature map and the image feature map, output a second image fusion attention feature map by fusing image height-axial column relationship information of the image with the first image attention feature map, and generate a second image attention feature map of the image based on the second image fusion attention feature map and the first image attention feature map.

According to an aspect of the present disclosure, a method of estimating an optical flow includes generating a plurality of first clusters including features of a first image feature map representing a first image by clustering the first image feature map, determining a pixel in a second image corresponding to a center feature from among the features respectively included in the plurality of first clusters from a second image feature map representing the second image, obtaining a loss matrix based on the first clusters and the determined pixel in the second image, and estimating an optical flow of the first image and the second image based on the loss matrix.

Additional aspects of embodiments may be set forth in part in the description which follows and, in part, may be apparent from the description, and/or may be learned by practice of the disclosure.

BRIEF DESCRIPTION OF THE DRAWINGS

The above and/or other aspects, features, and advantages of certain embodiments of the present disclosure may be more apparent from the following description taken in conjunction with the accompanying drawings, in which.

DETAILED DESCRIPTION

Figure 1:
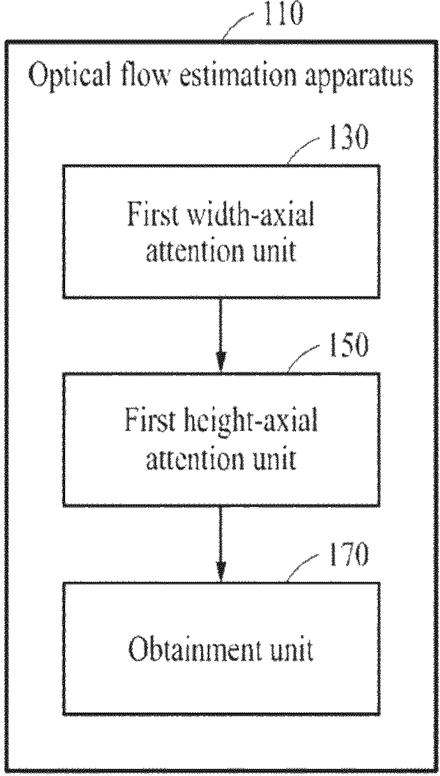
FIG. 1 illustrates an example of an optical flow estimation apparatus, according to an embodiment.

Hereinafter, embodiments are described with reference to the accompanying drawings. When describing the embodiments with reference to the accompanying drawings, like reference numerals may refer to like elements and any repeated description related thereto may be omitted.

The electronic device, according to various embodiments, disclosed herein may be one of various types of electronic devices. For example, the electronic device may be and/or may include a portable communication device (e.g., a smartphone), a computer device, a portable multimedia device, a portable medical device, a camera, a wearable device, a home appliance, and the like. However, the present disclosure is not limited in this regard. That is, the electronic device may be and/or may include other devices and/or device types than those described above.

It may be appreciated that embodiments of the disclosure and the terms used therein may not be intended to limit the technological features set forth herein to particular embodiments and may include various changes, equivalents, and/or replacements for a corresponding embodiment. With regard to the description of the drawings, similar reference numerals may be used to refer to similar and/or related elements. It is to be understood that a singular form of a noun corresponding to an item may include one or more of the things, unless the relevant context clearly indicates otherwise. As used herein, "A or B", "at least one of A and B", "at least one of A or B", "A, B, or C", "at least one of A, B, and C", and "at least one of A, B, or C", each of which may include any one of the items listed together in the corresponding one of the phrases, or all possible combinations thereof. Terms such as "first", "second", or "third" may simply be used to distinguish the component from other components in question, and may not limit the components in other aspects (e.g., importance and/or order). It is to be understood that if an element (e.g., a first element) is referred to, with or without the term "operatively" or "communicatively", as "coupled with," "coupled to," "connected with," or "connected to" another element (e.g., a second element), it may indicate that the element may be coupled with the other element directly (e.g., wiredly), wirelessly, and/or via a third element.

As used in connection with various embodiments of the disclosure, the terms "module", "component", "unit", and the like may include a unit implemented in hardware, software, firmware, and/or a combination thereof, and may interchangeably be used with other terms, such as, but not limited to, "logic," "logic block," "part," "circuitry", and the like. As used herein, a module may be and/or may include a single integral component, or a minimum unit or part thereof, adapted to perform one or more functions. For example, according to an embodiment, a module may be implemented in a form of an application-specific integrated circuit (ASIC).

Various embodiments as set forth herein may be implemented as software (e.g., a program) that may include one or more instructions that may be stored in a storage medium (e.g., an internal memory and/or an external memory) and/or that may be readable by a machine (e.g., an electronic device). For example, a processor of the machine (e.g., the electronic device) may invoke at least one of the one or more instructions stored in the storage medium, and execute the one or more instructions. Thus, the machine may be operated to perform at least one function according to the one instructions. The one or more instructions may include code generated by a compiler and/or code executable by an interpreter. The machine-readable storage medium may be provided in the form of a non-transitory storage medium. As used herein, the term "non-transitory" simply means that the storage medium is a tangible device, and does not include a signal (e.g., an electromagnetic wave), but this term does not differentiate between where data is semi-permanently stored in the storage medium and where the data is temporarily stored in the storage medium.

According to an embodiment, a method according to various embodiments disclosed herein may be included and/or provided in a computer program product. The computer program product may be traded as a product between a seller and a buyer. The computer program product may be distributed in the form of a machine-readable storage medium (e.g., compact disc read only memory (CD-ROM)), or be distributed (e.g., downloaded or uploaded) online via an application store (e.g., PlayStore™), or between two user devices (e.g., smartphones) directly. If distributed online, at least part of the computer program product may be temporarily generated or at least temporarily stored in the machine-readable storage medium, such as memory of the manufacturer's server, a server of the application store, and/or a relay server.

According to embodiments, each component (e.g., a module or a program) of the above-described components may include a single entity or multiple entities, and some of the multiple entities may be separately disposed in different components. According to an embodiment, one or more of the above-described components or operations may be omitted, or one or more other components or operations may be added. Alternatively or additionally, a plurality of components (e.g., modules or programs) may be integrated into a single component. In such a case, the integrated component may still perform one or more functions of each of the plurality of components in the same or similar manner as they are performed by a corresponding one of the plurality of components before the integration. According to various embodiments, operations performed by the module, the program, or another component may be carried out sequentially, in parallel, repeatedly, or heuristically, or one or more of the operations may be executed in a different order or omitted, or one or more other operations may be added.

It is to be understood that the specific order or hierarchy of blocks in the processes/flowcharts disclosed are an illustration of exemplary approaches. Based upon design preferences, it is understood that the specific order or hierarchy of blocks in the processes/flowcharts may be rearranged. Further, some blocks may be combined or omitted. The accompanying claims present elements of the various blocks in a sample order, and are not meant to be limited to the specific order or hierarchy presented.

The embodiments herein may be described and illustrated in terms of blocks, as shown in the drawings, which carry out a described function or functions. These blocks, which may be referred to herein as units or modules or the like, or by names such as device, logic, circuit, counter, comparator, generator, converter, or the like, may be physically implemented by analog and/or digital circuits including one or more of a logic gate, an integrated circuit, a microprocessor, a microcontroller, a memory circuit, a passive electronic component, an active electronic component, an optical component, and the like, and may also be implemented by or driven by software and/or firmware (configured to perform the functions or operations described herein).

By way of introduction, concepts related to optical flow estimation are described first.

Optical flow estimation may refer to a technology for calculating a two-dimensional movement of a pixel in consecutive images of two frames. The two-dimensional movement of the pixel may be divided into two orthogonal displacements (e.g., a horizontal displacement and a vertical displacement).

Related optical flow estimation apparatuses may perform an attention operation on an image feature map of an image through a transformer, for example. An image feature map obtained through the attention operation may reflect global information of the image. For example, calculating a loss matrix of the two frame images using the image feature map (e.g., the image feature map obtained through the attention operation) may improve the accuracy of a correlation loss of pixels.

The related transformer may include a multi-head self-attention (MSA) module and a feed-forward network (FFN). The output of the related transformer may be represented by equations similar to Equations 1 to 3.

$$y = x' + FFN(x') \quad \text{[Eq. 1]}$$

$$x' = x + MSA(Proj(x)) \quad \text{[Eq. 2]}$$

$$MSA(Q, K, V) = \text{Softmax}\left(\frac{QK^T}{\sqrt{C_k}}\right)V \quad \text{[Eq. 3]}$$

Referring to Equations 1 and 2, $x \in R^{H \times w \times C}$ may represent an input sequence, H, W, and C may represent the spatial dimension and the number of channels of the sequence, respectively, and y may represent the output of the transformer.

Referring to Equation 3, MSA(Q, K, V) may represent the output of the MSA module, Q may represent a query, K may represent a key, and V may represent a value. The MSA module may obtain three (3) sequences (e.g., the query Q, the key K, and the value V) through a projector. The projector may include a plurality of linear layers. The projector may convert an input with the number of dimensions of C to a spatial dimension of $C_k$.

The FFN may include at least one fully connected layer and at least one non-linear activation layer. For example, the FFN may include two fully connected layers and one non-linear activation layer. The first fully connected layer may convert the input dimension (e.g., C) to $C_f$=4C. The second fully connected layer may convert the dimension from $C_f$ to C. The output of the FFN may be represented as an equation similar to Equation 4 below.

$$FFN(x') = \sigma(x' W_1 + b_1)W_2 + b_2 \quad \text{[Eq. 4]}$$

Referring to Equation 4, $$W_1 \in R^{C \times C_f} \text{ and } W_2 \in R^{C_f \times C}$$

may represent a weight of the first fully connected layer and a weight of the second fully connected layer, respectively, σ may represent a non-linear activation Gaussian error linear unit (GELU) function, and $b_1$ and $b_2$ may represent a bias of the first fully connected layer and a bias of the second fully connected layer, respectively.

The complexity of computation and/or memory usage in the related optical flow estimation methods may be expressed as $O(H^2W^2)$. In some embodiments, the complexity of computation and/or memory usage may be reduced through lightening the transformer. For example, a standard self-attention operation may be performed in a local window to lighten the transformer. However, the complexity of the standard self-attention operation in the local window may be proportional to a quadratic of the local window length. In some embodiments, hyperparameters may be introduced to balance the performance and the complexity.

Complexity may be potentially reduced by obtaining the image feature map of the image through (using) an axially separated attention mechanism. For example, a one-dimensional standard MSA module may set the width-axis and the height-axis of the image as the axial attention layers. One axial attention layer may transmit information along a predetermined axis.

To obtain information in two dimensions, axial attention may use the two axial attention layers (e.g., the axes orthogonal to each other) in two directions. The obtained features may be orthogonal to each other, and attentions of rows (or columns) in the width-axial (or height-axial) direction may be independent of each other. These independent features may be disadvantageous to obtaining global context information.

Hereinafter, various embodiments of the present disclosure are described with reference to the accompanying drawings.

FIG. 1 illustrates an example of an optical flow estimation apparatus, according to an embodiment.

Referring to FIG. 1, according to an embodiment, an optical flow estimation apparatus 110 may include a first width-axial attention unit 130, a first height-axial attention unit 150, and an obtainment unit 170.

The number and arrangement of components of the optical flow estimation apparatus 110 shown in FIG. 1 are provided as an example. In practice, there may be additional components, fewer components, different components, or differently arranged components than those shown in FIG. 1. Furthermore, two or more components shown in FIG. 1 may be implemented within a single component, or a single component shown in FIG. 1 may be implemented as multiple, distributed components. Alternatively or additionally, a set of (one or more) components shown in FIG. 1 may be integrated with each other, and/or may be implemented as an integrated circuit, as software, and/or a combination of circuits and software.

According to an embodiment, the optical flow estimation apparatus 110 may process a first image and a second image separately through an image processing pass. The first image and the second image may be images of two consecutive frames. The image processing pass may be a pass for processing the first image and the second image separately.

According to an embodiment, the optical flow estimation apparatus 110 may estimate an optical flow based on second image attention feature maps (e.g., second image attention feature map $X^v$ 465 of FIG. 4) of the first image and the second image. The second image attention feature maps (e.g., second image attention feature map $X^v$ 465) may include image feature maps obtained by processing the first image and the second image through the image processing pass.

According to an embodiment, the optical flow estimation apparatus 110 may obtain a first image attention feature map (e.g., first image attention feature map $X^h$ 370 of FIG. 3) of an image (e.g., the first image and/or the second image) through the image processing pass. For example, the first width-axial attention unit 130 may add a first row vector (e.g., a first row vector 310 of FIG. 3) to an image feature map (e.g., image feature map X 305 of FIG. 3). The first width-axial attention unit 130 may obtain a first image fusion attention feature map (e.g., a first image fusion attention feature map 360 of FIG. 3) of each image in which the image feature map X 305 of the image, to which the first row vector 310 has been added, is fused with row relationship information of each image through a first multi-head attention module (e.g., a first multi-head attention module 300 of FIG. 3) corresponding to each image. The first width-axial attention unit 130 may obtain the first image attention feature map (e.g., first image attention feature map $X^h$ 370) of the image based on the first image fusion attention feature map 360 and the image feature map X 305 of the image. The image processing pass for obtaining the first image attention feature map (e.g., first image attention feature map $X^h$ 370) described above has been described based on the image but may be applied to each of the first image and the second image. For example, the optical flow estimation apparatus 110 may obtain a first image attention feature map (e.g., first image attention feature map $X^h$ 370) of the first image through the image processing pass. The operation of obtaining the first image attention feature map (e.g., first image attention feature map $X^h$ 370) is described with reference to FIG. 3.

According to an embodiment, the optical flow estimation apparatus 110 may obtain a second image attention feature map $X^v$ 465 of the image through the image processing pass. For example, the first height-axial attention unit 150 may add a first column vector (e.g., a first column vector 410 of FIG. 4) to the first image attention feature map (e.g., first image attention feature map $X^h$ 370). The first height-axial attention unit 150 may input the first image attention feature map (e.g., first image attention feature map $X^h$ 370) of the image, to which the first column vector 410 has been added, into a second multi-head attention module (e.g., a second multi-head attention module 400 of FIG. 4) corresponding to the image. The first height-axial attention unit 150 may obtain a second image fusion attention feature map (e.g., second image fusion attention feature map 460 in FIG. 4) in which row relationship information and column relationship information of the image are fused. The first height-axial attention unit 150 may generate (or obtain) the second image attention feature map $X^v$ 465 based on the second image fusion attention feature map 460 and the first image attention feature map (e.g., first image attention feature map $X^h$ 370) of the image. The image processing pass for obtaining the second image attention feature map $X^v$ 465 described above has been described based on the image but may be applied to each of the first image and the second image. For example, the optical flow estimation apparatus 110 may obtain a second image attention feature map $X^v$ 465 of the first image through the image processing pass. The operation of obtaining the second image attention feature map $X^v$ 465 is described with reference to FIG. 4.

According to an embodiment, the obtainment unit 170 may estimate an optical flow based on the second image attention feature map $X^v$ 465 of the first image and the second image attention feature map $X^v$ 465 of the second image.

Figure 5:
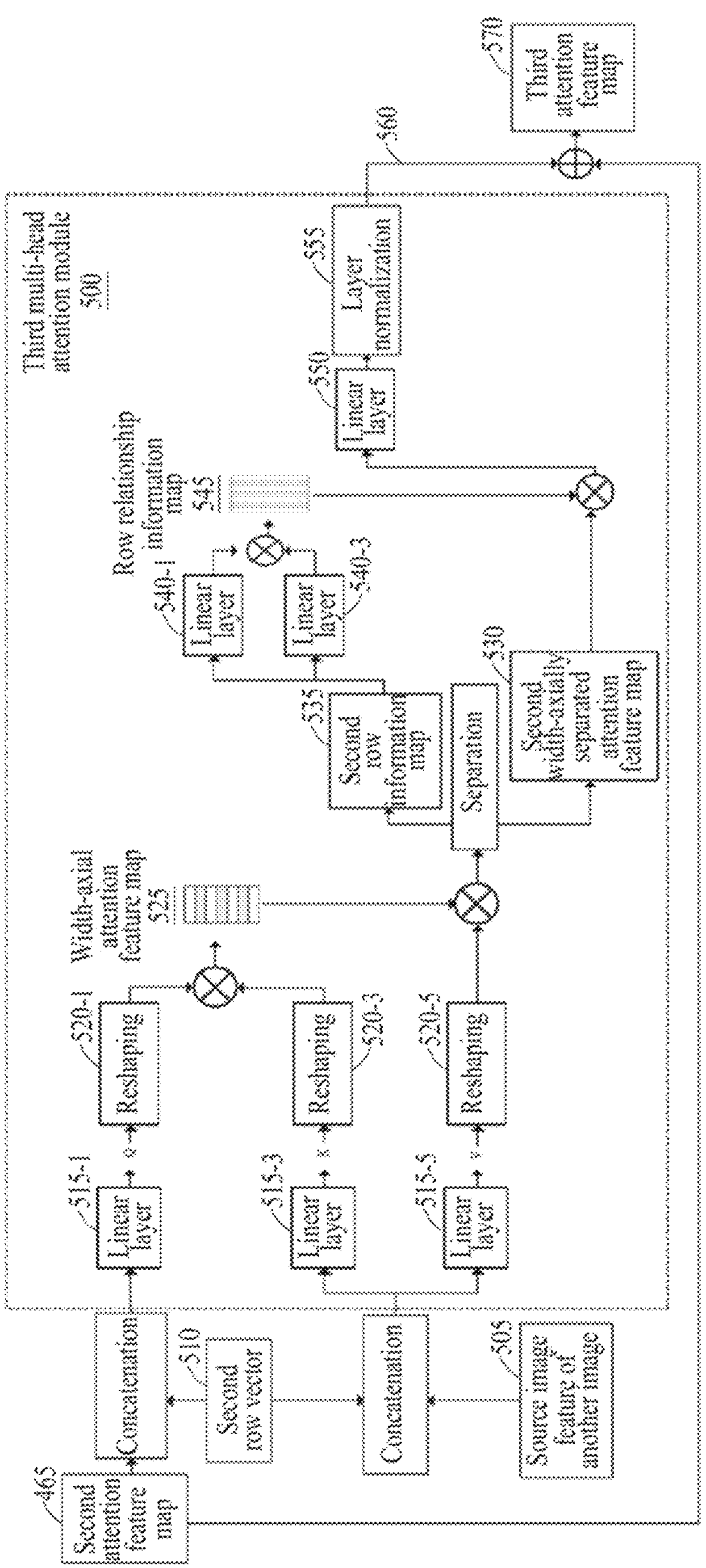
FIG. 5 is a diagram illustrating an operation of obtaining a third image attention feature map, according to an embodiment.

According to an embodiment, with respect to the first image, the obtainment unit 170 may add a second row vector (e.g., a second row vector 510 of FIG. 5) to the second image attention feature map $X^v$ 465 of the first image and a source image feature 505 of another image of FIG. 5 (e.g., the second image other than the first image for which a third image attention feature map 570 is to be obtained). The obtainment unit 170 may input the second image attention feature map $X^v$ 465 of the first image, to which the second row vector 510 has been added, and the image feature map of the second image 505, to which the second row vector 510 has been added, into a third multi-head attention module (e.g., a third multi-head attention module 500 of FIG. 5) corresponding to the first image. The obtainment unit 170 may obtain a third image fusion attention feature map (e.g., a third image fusion attention feature map 560 of FIG. 5) of the first image in which row relationship information of the second image is further fused. The obtainment unit 170 may obtain a third image attention feature map 570 of the first image based on the third image fusion attention feature map 560 of the first image and the second image attention feature map $X^v$ 465 of the first image. Although the operation of obtaining the third image attention feature map 570 of the first image has been described above, the description may apply in a substantially similar and/or the same manner to the second image. That is, the obtainment unit 170 may obtain a third image attention feature map 570 of the second image based on the second image attention feature map $X^v$ 465 of the second image and a source image feature 505 of another image of FIG. 5 (e.g., the first image other than the second image for which the third image attention feature map 570 is to be obtained). The operation of obtaining the third image attention feature map 570 of the image is described with reference to FIG. 5.

According to an embodiment, the obtainment unit 170 may add a second column vector (e.g., a second column vector 610 of FIG. 6) to the third image attention feature map 570 of the first image. The obtainment unit 170 may input the third image attention feature map 570 of the first image, to which the second column vector 610 has been added, into a fourth multi-head attention module (e.g., a fourth multi-head attention module 600 of FIG. 6) corresponding to the first image. The obtainment unit 170 may obtain a fourth image fusion attention feature map (e.g., a fourth image fusion attention feature map 660 of FIG. 6) of the first image in which column relationship information of the second image is further fused. The obtainment unit 170 may obtain a fourth image attention feature map (e.g., a fourth image attention feature map 670 of FIG. 6) of the first image based on the fourth image fusion attention feature map 660 of the first image and the third image attention feature map 570 of the first image. Although the operation of obtaining the fourth image attention feature map 670 of the first image has been described above, the description may apply substantially identically to the second image as well. The operation of obtaining the fourth image attention feature map 670 of the image is described with reference to FIG. 6.

According to an embodiment, the obtainment unit 170 may estimate an optical flow based on the fourth image attention feature map 670 of the first image and the fourth image attention feature map 670 of the second image. For example, the obtainment unit 170 may obtain a loss matrix (e.g., a cost volume 770 of FIG. 7) based on the fourth image attention feature map 670 of the first image and the fourth image attention feature map 670 of the second image. The obtainment unit 170 may estimate the optical flow of the first image and the second image (e.g., optical flow 790 of FIG. 7) based on the cost volume 770.

According to an embodiment, the first width-axial attention unit 130 may concatenate the first row vector 310 and the image feature map X 305 of the image. The first width-axial attention unit 130 may input the result of the concatenation operation into the first multi-head attention module 300 corresponding to the image. The first width-axial attention unit 130 may obtain a first vector feature map of the image. In an embodiment, the first vector feature map may be width-axially separated. Alternatively or additionally, the first vector feature map may be and/or may include an attention-learnable feature map. The first vector feature map may be separated into a first width-axially separated attention feature map (e.g., a first width-axially separated attention feature map 330 of FIG. 3) and a first row information map (e.g., a first row information map 335 of FIG. 3).

The first width-axial attention unit 130 may obtain a row relationship information map (e.g., a row relationship information map 345 of FIG. 3) of the image based on the first row information map 335 of the image. The first width-axial attention unit 130 may obtain a first image fusion attention feature map 360 in which the row relationship information of the image is fused, based on the row relationship information map 345 and the first width-axially separated attention feature map 330.

For example, the first height-axial attention unit 150 may concatenate the first column vector 410 and the first image attention feature map (e.g., first image attention feature map $X^h$ 370) of the image. The first height-axial attention unit 150 may input the result of the concatenation into the second multi-head attention module 400 corresponding to the image. The first height-axial attention unit 150 may obtain a second vector feature map of the image. In an embodiment, the second vector feature map may be separated in the height-axial direction of the image. Alternatively or additionally, the second vector feature map may be and/or may include an attention-learnable feature map. The second vector feature map may be separated into a first height-axially separated attention feature map (e.g., a first height-axially separated attention feature map 430 of FIG. 4) and a first column information map (e.g., a first column information map 435 of FIG. 4).

The first height-axial attention unit 150 may obtain a column relationship information map (e.g., a column relationship information map 445 of FIG. 4) based on the first column information map 435. The first height-axial attention unit 150 may obtain a second image fusion attention feature map 460 in which the row relationship information and the column relationship information of the image are fused, based on the column relationship information map 445 and the first height-axially separated attention feature map 430 of the image.

For example, the row relationship information map (e.g., the row relationship information map 345 of FIG. 3 and the row relationship information map 545 of FIG. 5) and/or the column relationship information map (e.g., the column relationship information map 445 of FIG. 4 and the column relationship information map 645 of FIG. 6) may be obtained using an equation similar to Equation 5 below.

$$\text{relation\_map} = \text{Softmax}\left(\frac{Proj(\text{info\_map})Proj(\text{info\_map})^T}{\sqrt{C_{num}}}\right) \quad \text{[Eq. 5]}$$

Referring to Equation 5, relation_map may represent the row relationship information map 345 and/or the column relationship information map 445, Proj may represent a linear projection, info_map may represent the row information map (e.g., the first row information map 335) or the column relationship information map (e.g., the first column information map 435), and $C_{num}$ may represent the number of channels.

Figure 2:
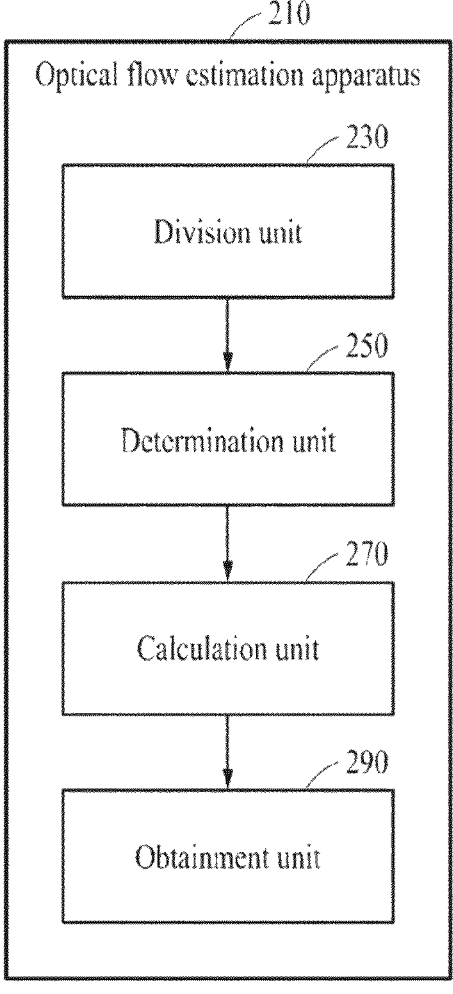
FIG. 2 illustrates another example of an optical flow estimation apparatus, according to an embodiment.

FIG. 2 illustrates another example of an optical flow estimation apparatus, according to an embodiment.

Referring to FIG. 2, according to an embodiment, an optical flow estimation apparatus 210 may include a division unit 230, a determination unit 250, a calculation unit 270, and an obtainment unit 290. The optical flow estimation apparatus 210 may include and/or may be similar in many respects to the optical flow estimation apparatus 110 of FIG. 1, and may include additional features not mentioned above. Consequently, repeated descriptions of the optical flow estimation apparatus 210 described above with reference to FIG. 1 may be omitted for the sake of brevity.

The number and arrangement of components of the optical flow estimation apparatus 210 shown in FIG. 2 are provided as an example. In practice, there may be additional components, fewer components, different components, or differently arranged components than those shown in FIG. 2. Furthermore, two or more components shown in FIG. 2 may be implemented within a single component, or a single component shown in FIG. 2 may be implemented as multiple, distributed components. Alternatively or additionally, a set of (one or more) components shown in FIG. 2 may be integrated with each other, and/or may be implemented as an integrated circuit, as software, and/or a combination of circuits and software.

According to an embodiment, the optical flow estimation apparatus 210 may generate a plurality of first clusters by clustering a first image feature map (e.g., image feature map X 305 of FIG. 3) representing a first image. The first clusters may include features of the first image feature map. For example, the division unit 230 may divide the features of the image feature map of the first image into a plurality of subsets. The division unit 230 may cluster the features of the image feature map of the first image. The division unit 230 may divide the features of the image feature map of the first image into the plurality of first clusters.

According to an embodiment, the optical flow estimation apparatus 210 may determine a pixel in a second image corresponding to a center feature from among the features respectively included in the first clusters from a second image feature map representing the second image. For example, the determination unit 250 may determine K features most associated with the cluster center feature of each cluster among the plurality of first clusters in an image feature matrix of the second image, where K is a positive integer greater than zero (0).

According to an embodiment, the optical flow estimation apparatus 210 may obtain a loss matrix (e.g., the cost volume 770 of FIG. 7) based on the first clusters and the pixel in the second image (corresponding to the center feature among the features respectively included in the first clusters). For example, the optical flow estimation apparatus 210 may obtain the loss matrix by calculating a correlation between the center feature and the pixel in the second image. As another example, according to an embodiment, the calculation unit 270 may obtain the loss matrix (e.g., the cost volume 770) of the first image and the second image by calculating correlations of each cluster and the K features corresponding to each cluster.

Figure 7:
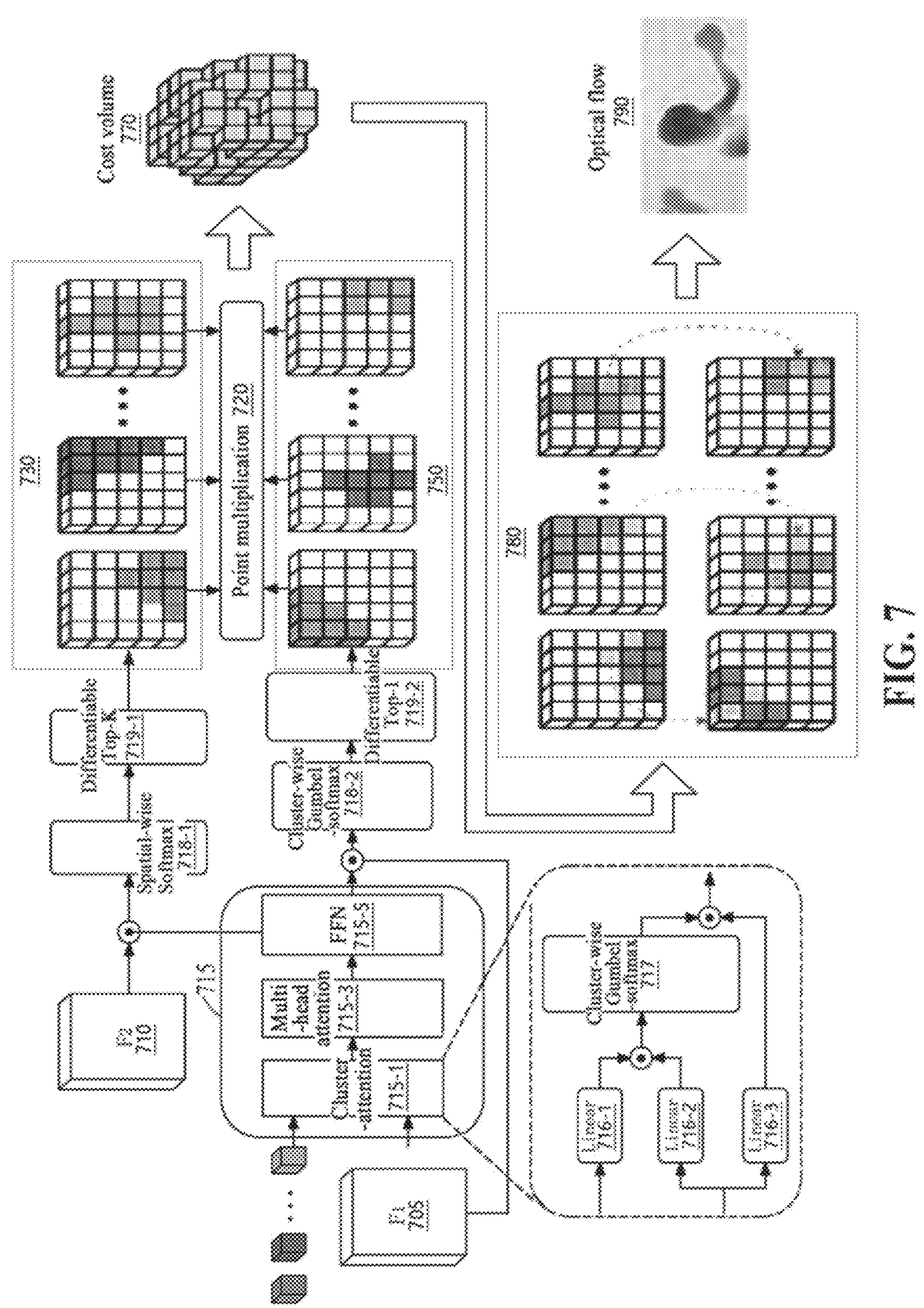
FIG. 7 illustrates an example of an operation of estimating an optical flow, according to an embodiment.

According to an embodiment, the optical flow estimation apparatus 210 may estimate an optical flow (e.g., an optical flow 790 of FIG. 7) of the first image and the second image based on the loss matrix (e.g., the cost volume 770 of FIG. 7). For example, the obtainment unit 290 may estimate the optical flow 790 of the first image and the second image based on the loss matrix (e.g., the cost volume 770).

The method of obtaining (or calculating) the loss matrix (e.g., the cost volume 770) by the optical flow estimation apparatus 210 and the method of estimating the optical flow 790 by the optical flow estimation apparatus 210 are described with reference to FIG. 7.

Figure 3:
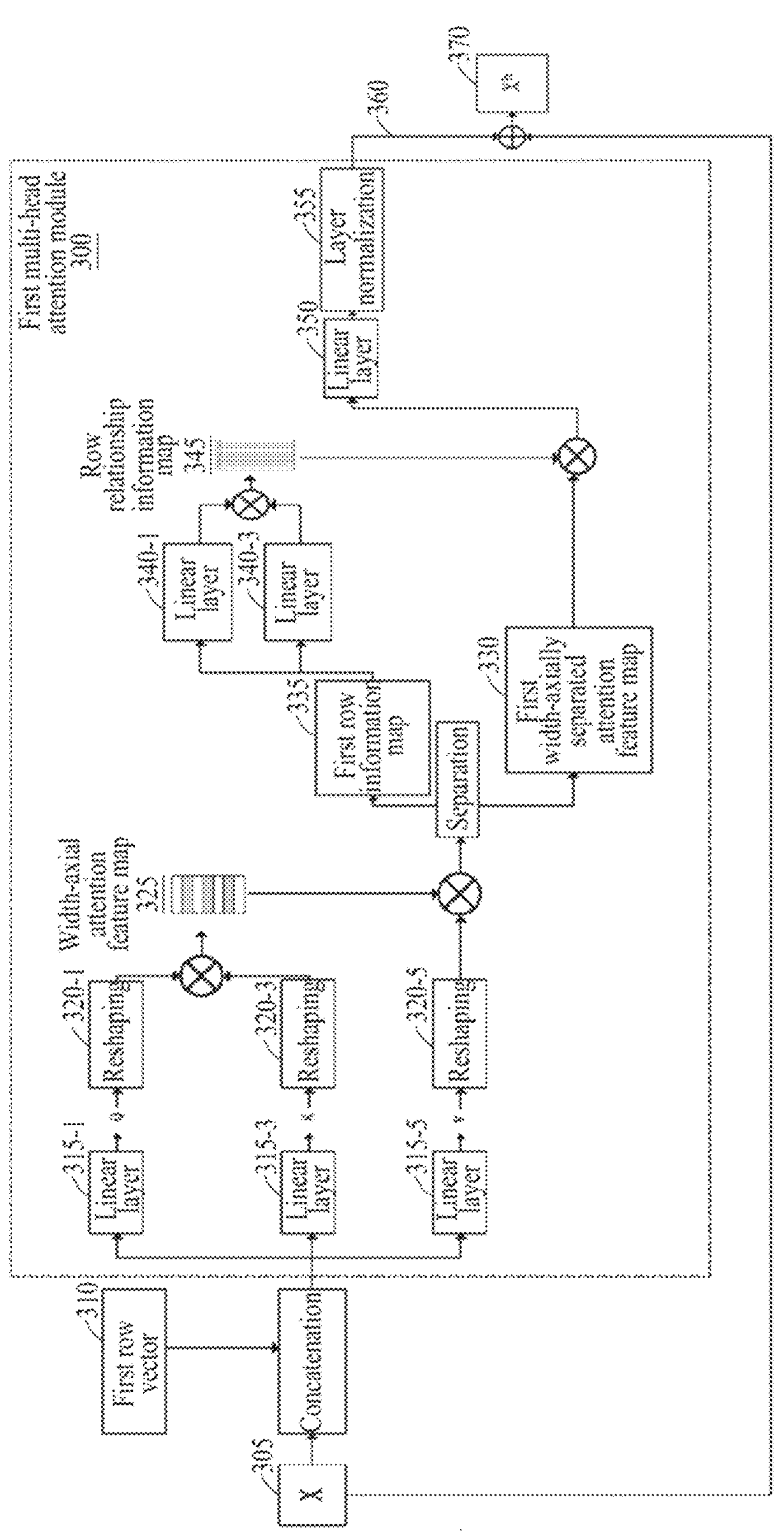
FIG. 3 is a diagram illustrating an operation of obtaining a first image attention feature map, according to an embodiment.

FIG. 3 is a diagram illustrating an operation of obtaining a first image attention feature map, according to an embodiment.

Referring to FIG. 3, according to an embodiment, the optical flow estimation apparatus 110 may output the first image attention feature map $X^h$ 370 of the image through the first multi-head attention module 300 based on the image feature map X 305 of the image. The image may include a first image and a second image. Although the following operation is described based on the image, the description may apply in a substantially similar and/or the same manner to the first image and/or the second image.

According to an embodiment, the image processing pass may include a pass for extracting the image feature map X 305 for the image by encoding the image. For example, the optical flow estimation apparatus 110 may extract the image feature map X 305 based on the image. As another example, the image feature map X 305 may be extracted from the first image and/or the second image using a feature encoder. In an embodiment, the optical flow estimation apparatus 110 may obtain the image feature map X 305 of the image through a convolutional network.

According to an embodiment, the image processing pass may include a pass for outputting a first image fusion attention feature map 360 by fusing width-axial row relationship information of the image with the image feature map X 305. For example, the optical flow estimation apparatus 110 may add the first row vector 310 to the image feature map X 305. The optical flow estimation apparatus 110 may input the image feature map, to which the first row vector 310 has been added, into the first multi-head attention module 300 corresponding to the image. The optical flow estimation apparatus 110 may obtain the first image fusion attention feature map 360 of the image in which the row relationship information of the image is fused.

As another example, the optical flow estimation apparatus 110 may concatenate the image feature map X 305 and the first row vector 310. The optical flow estimation apparatus 110 may obtain the first image fusion attention feature map 360 of the image based on the concatenation result (e.g., a first row vector-feature map). The optical flow estimation apparatus 110 may obtain the first image fusion attention feature map 360 from the first row vector-feature map through the first multi-head attention module 300.

That is, the optical flow estimation apparatus 110 may obtain a query, a key, and a value by inputting the first row vector-feature map into linear layers (e.g., first linear layer 315-1, second linear layer 315-3, and third linear layer 315-5, hereinafter "315" generally), respectively. The optical flow estimation apparatus 110 may generate a query with predetermined dimensions, a key with predetermined dimensions, and/or a value with predetermined dimensions by reshaping the query, the key, and the value through reshaping layers (e.g., first reshaping layer 320-1, second reshaping layer 320-3, and third reshaping layer 320-5, hereinafter "320" generally), respectively. The optical flow estimation apparatus 110 may obtain the width-axial attention feature map 325 by performing cross-multiplication of the query with predetermined dimensions and the key with predetermined dimensions. The optical flow estimation apparatus 110 may perform cross-multiplication on the width-axial attention feature map 325 and the value with predetermined dimensions. In an embodiment, the optical flow estimation apparatus 110 may generate a first vector feature map. In an optional or additional embodiment, the optical flow estimation apparatus 110 may generate the first row information map 335 and the first width-axially separated attention feature map 330 by separating the first vector feature map. The optical flow estimation apparatus 110 may linearly project the first row information map 335 through linear layers (e.g., first linear layer 340-1 and second linear layer 340-3, hereinafter "340" generally). The optical flow estimation apparatus 110 may generate the first row relationship information map 345 based on the output results of the linear layers 340. The optical flow estimation apparatus 110 may use the output results of the linear layers 340 as the query and the key, respectively. The optical flow estimation apparatus 110 may generate the row relationship information map 345 by performing cross-multiplication on the query (e.g., the output result of the first linear layer 340-1) and the key (e.g., the output result of the second linear layer 340-3). The method of generating the row relationship information map 345 is described with reference to Equation 5, and thus, repeated description thereof is omitted for the sake of brevity.

According to an embodiment, the optical flow estimation apparatus 110 may perform cross-multiplication on the row relationship information map 345 of the image and the first width-axially separated attention feature map 330. The optical flow estimation apparatus 110 may obtain the first image fusion attention feature map 360 by inputting the cross-multiplication result into a linear layer 350 and a layer normalization layer 355. The linear layer 350 may be and/or may include a cascaded linear layer. The first image fusion attention feature map 360 may be and/or may include an image feature map in which the row relationship information of the image may be fused. The first image fusion attention feature map 360 may be and/or may include a width-axially separated feature map of the image.

According to an embodiment, the image processing pass may include a pass for outputting the first image attention feature map (e.g., first image attention feature map $X^h$ 370) of the image. For example, the optical flow estimation apparatus 110 may output the first image attention feature map $X^h$ 370 based on the first image fusion attention feature map 360 and the image feature map X 305.

According to an embodiment, the optical flow estimation apparatus 110 may obtain the row relationship information for the image by introducing a row-learnable vector. The optical flow estimation apparatus 110 may optimize the image feature map X 305 based on a width-axially separated attention operation mechanism (e.g., an operation mechanism through the first multi-head attention module 300 of FIG. 3). The optical flow estimation apparatus 110 may further optimize the image feature map X 305 using the row relationship information of the image. Consequently, the first image attention feature map $X^h$ 370 may potentially better reflect the relationship between rows of the image, when compared to related optical flow estimation techniques. Alternatively or additionally, the first image attention feature map $X^h$ 370 may potentially better reflect global information of the image, when compared to related optical flow estimation techniques.

Figure 4:
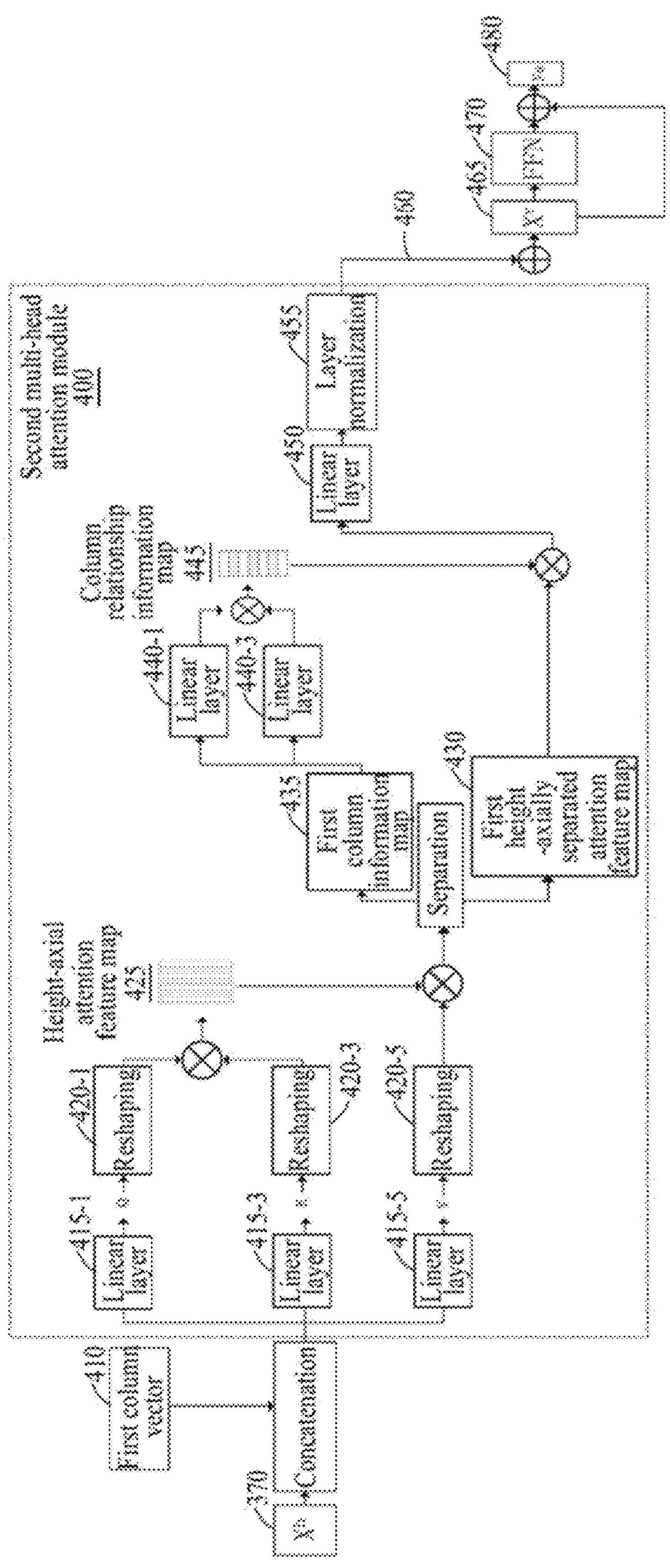
FIG. 4 is a diagram illustrating an operation of obtaining a second image attention feature map, according to an embodiment.

FIG. 4 is a diagram illustrating an operation of obtaining a second image attention feature map, according to an embodiment.

Referring to FIG. 4, according to an embodiment, the optical flow estimation apparatus 110 may output the second image attention feature map $X^v$ 465 of the image through the second multi-head attention module 400 based on the image feature map (e.g., the image feature map X 305 of FIG. 3) of the image. The image may include a first image and a second image. Although the following operation is described based on the image, the description may apply in a substantially similar and/or the same manner to the first image and/or the second image.

According to an embodiment, the image processing pass may include a pass for outputting the second image fusion attention feature map 460. The optical flow estimation apparatus 110 may output the second image fusion attention feature map 460 by fusing height-axial column relationship information of the image with the image first attention feature map $X^h$ 370.

For example, the optical flow estimation apparatus 110 may concatenate the first column vector 410 and the image first attention feature map $X^h$ 370 of the first image. The optical flow estimation apparatus 110 may obtain the second image fusion attention feature map 460 of the image based on the concatenation result (e.g., a first column vector-feature map). The optical flow estimation apparatus 110 may obtain the second image fusion attention feature map 460 from the first column vector-feature map through the second multi-head attention module 400.

That is, the optical flow estimation apparatus 110 may obtain a query, a key, and a value by inputting the first column vector-feature map into linear layers (e.g., first linear layer 415-1, second linear layer 415-3, and third linear layer 415-5, hereinafter "415" generally), respectively. The optical flow estimation apparatus 110 may obtain a query, a key, and a value with predetermined dimensions by reshaping the query, the key, and the value through reshaping layers (e.g., first reshaping layer 420-1, second reshaping layer 420-3, and third reshaping layer 420-5, hereinafter "420" generally), respectively. The optical flow estimation apparatus 110 may obtain the height-axial attention feature map 425 by performing cross-multiplication of the query with predetermined dimensions and the key with predetermined dimensions. The optical flow estimation apparatus 110 may generate a second vector feature map by performing cross-multiplication on the height-axial attention feature map 425 and the value with predetermined dimensions.

The optical flow estimation apparatus 110 may generate the first height-axially separated attention feature map 430 of the image and the first column information map 435 by separating the second vector feature map. The optical flow estimation apparatus 110 may linearly project the first column information map 435 through linear layers (e.g., first linear layer 440-1 and second linear layer 440-3, hereinafter "440" generally). The optical flow estimation apparatus 110 may use the output results of the first and second linear layers 440-1 and 440-3 as the query and the key, respectively. The optical flow estimation apparatus 110 may obtain the first column relationship information map 445 of the image by performing cross-multiplication on the query (e.g., the output result of the linear layer 440-1) and the key (e.g., the output result of the linear layer 440-3). The method of generating the column relationship information map 445 is described with reference to Equation 5, and thus, repeated description thereof is omitted for the sake of brevity.

According to an embodiment, the optical flow estimation apparatus 110 may perform cross-multiplication on the column relationship information map 445 of the image and the first height-axially separated attention feature map 430. The optical flow estimation apparatus 110 may obtain the second image fusion attention feature map 460 by inputting the cross-multiplication result into a linear layer 450 and a layer normalization layer 455. The linear layer 450 may be and/or may include a cascaded linear layer. The second image fusion attention feature map 460 may be and/or may include an image feature map in which the row relationship information of the image and the column relationship information of the image may be fused. The second image fusion attention feature map 460 may be and/or may include a height-axially separated feature map of the image.

According to an embodiment, the image processing pass may include a pass for generating the second image attention feature map $X^v$ 465 of the image. The optical flow estimation apparatus 110 may generate the second image attention feature map $X^v$ 465 of the image based on the second image fusion attention feature map 460 of the image and the first image attention feature map $X^h$ 370 of the image. For example, the optical flow estimation apparatus 110 may obtain the second image attention feature map $X^v$ 465 of the image by adding the second image fusion attention feature map 460 of the image and first image attention feature map $X^h$ 370.

According to an embodiment, the optical flow estimation apparatus 110 may input the second image attention feature map $X^v$ 465 into an FFN 470. In an optional or additional embodiment, the output $y_0$ 480 of the FFN 470 may also be used as the second image attention feature map of the image.

FIG. 5 is a diagram illustrating an operation of obtaining a third image attention feature map, according to an embodiment.

Referring to FIG. 5, according to an embodiment, the optical flow estimation apparatus 110 may estimate an optical flow of two images based on the second image attention feature map $X^v$ 465 of the two images. The optical flow estimation apparatus 110 may optimize an image feature map (e.g., the image feature map X 305 of FIG. 3) through a self-attention mechanism (e.g., an attention operation through the first multi-head attention module 300 and the second multi-head attention module 400). The optical flow estimation apparatus 110 may optimize the image feature map X 305 of the image based on a cross-attention mechanism to potentially better reflect global information of the two images, when compared to related optical flow estimation techniques. Hereinafter, the optimizing of the image feature map X 305 based on the cross-attention mechanism (e.g., obtaining a third image attention feature map 570) is described.

According to an embodiment, the optical flow estimation apparatus 110 may generate the third image fusion attention feature map 560 of the first image in the second image attention feature map $X^v$ 465 of the first image based on the second image attention feature map $X^v$ 465 of the first image and the source image feature 505 of another image (e.g., the second image other than the first image for which the third image attention feature map 570 is to be obtained). The third image fusion attention feature map 560 of the first image may be and/or may include an image feature map in which the row relationship information of the second image is fused.

According to an embodiment, the optical flow estimation apparatus 110 may concatenate the second image attention feature map $X^v$ 465 of the first image and the second row vector 510. The optical flow estimation apparatus 110 may generate a second row vector-feature map by concatenating the image feature map 505 of the second image and the second row vector 510. The optical flow estimation apparatus 110 may obtain a third image fusion attention feature map 560 through the third multi-head attention module 500 based on the second row vector-feature map.

According to an embodiment, the optical flow estimation apparatus 110 may generate a query through a first linear layer 515-1 based on the result of concatenating the second image attention feature map $X^v$ 465 of the first image and the second row vector 510. The optical flow estimation apparatus 110 may generate a key and a value through a second linear layer 515-3 and a third linear layer 515-5, respectively, based on the second row vector-feature map. The optical flow estimation apparatus 110 may generate a query, a key, and a value with predetermined dimensions by reshaping the query, the key, and the value using reshaping layers (e.g., first reshaping layer 520-1, second reshaping layer 520-3, and third reshaping layer 520-5, hereinafter "520" generally), respectively. The optical flow estimation apparatus 110 may obtain a height-axial attention feature map 525 by performing cross-multiplication of the query with predetermined dimensions and the key with predetermined dimensions. The optical flow estimation apparatus 110 may generate a third vector feature map by performing cross-multiplication on the height-axial attention feature map 525 and the value with predetermined dimensions.

According to an embodiment, the optical flow estimation apparatus 110 may separate the third vector feature map into a second width-axially separated attention feature map 530 of the first image and second row information map 535.

According to an embodiment, the optical flow estimation apparatus 110 may linearly project the second row information map 535 through linear layers (e.g., first linear layer 540-1 and second linear layer 540-3, hereinafter "540" generally). The optical flow estimation apparatus 110 may use the output results of the first and second linear layers 540-1 and 540-3 as the query and the key, respectively. The optical flow estimation apparatus 110 may obtain the row relationship information map 545 of the first image by performing cross-multiplication on the query (e.g., the output result of the first linear layer 540-1) and the key (e.g., the output result of the second linear layer 540-3). The method of generating the row relationship information map 545 is described with reference to Equation 5, and thus, repeated description thereof is omitted for the sake of brevity.

According to an embodiment, the optical flow estimation apparatus 110 may perform cross-multiplication on the row relationship information map 545 of the first image and the second width-axially separated attention feature map 530. The optical flow estimation apparatus 110 may obtain the third image fusion attention feature map 560 of the first image through a linear layer 550 and a layer normalization layer 555 based on the cross-multiplication result. The linear layer 550 may be and/or may include a cascaded linear layer. The third image fusion attention feature map 560 may be and/or may include an image fusion attention feature map of the first image further including the row relationship information of the second image.

According to an embodiment, the optical flow estimation apparatus 110 may obtain the third image attention feature map 570 of the first image based on the third image fusion attention feature map 560 of the first image and the second image attention feature map $X^v$ 465 of the first image.

The operation of obtaining the third image attention feature map 570 of the second image may be substantially similar and/or the same as the operation of obtaining the third image attention feature map 570 of the first image, and thus, repeated description thereof is omitted for the sake of brevity.

Figure 6:
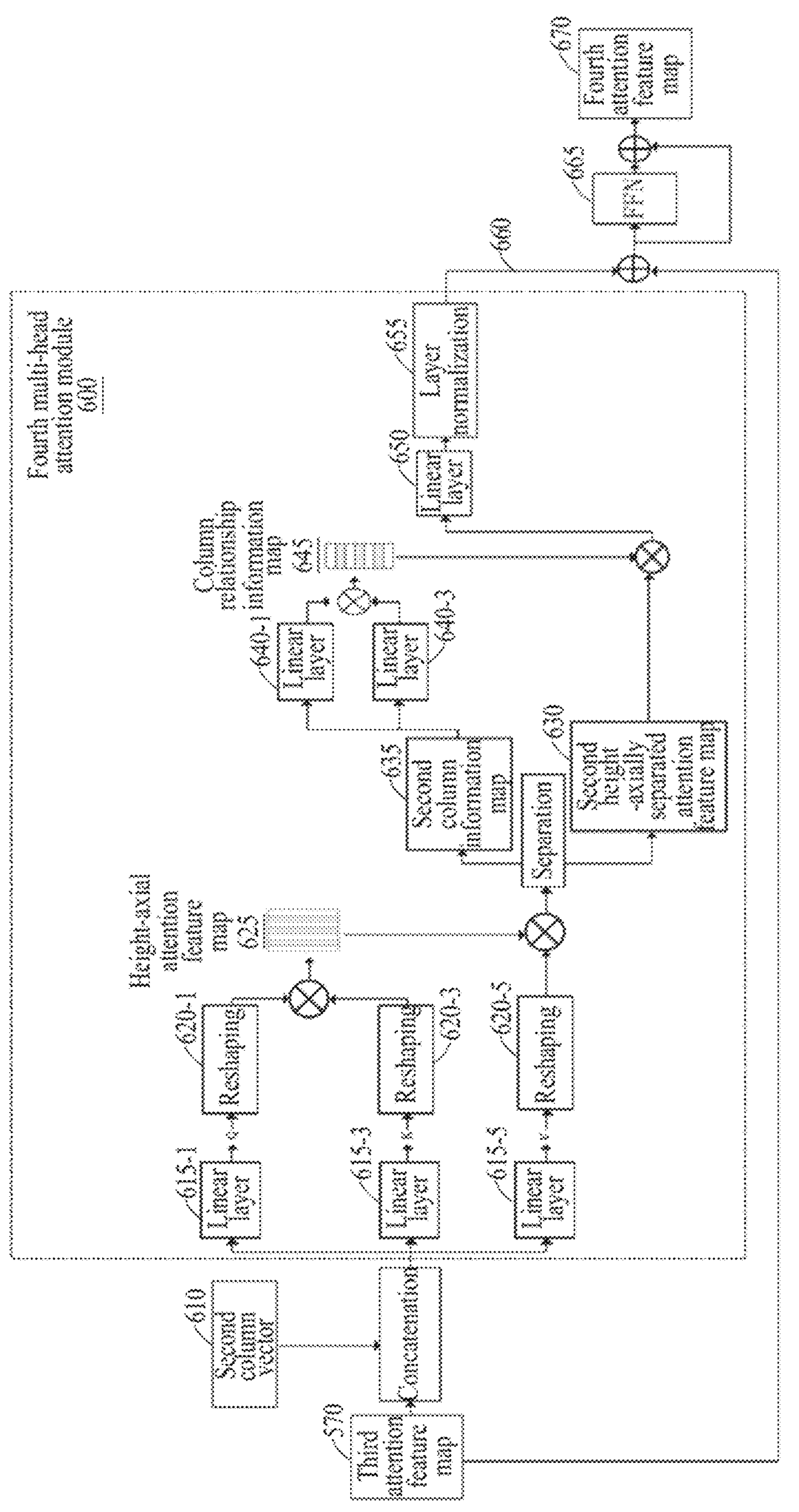
FIG. 6 is a diagram illustrating an operation of obtaining a fourth image attention feature map, according to an embodiment.

FIG. 6 is a diagram illustrating an operation of obtaining a fourth image attention feature map, according to an embodiment.

Referring to FIG. 6, according to an embodiment, the optical flow estimation apparatus 110 may obtain the fourth image fusion attention feature map 660 through the fourth multi-head attention module 600 based on the third image attention feature map 570 and the second column vector 610.

According to an embodiment, the optical flow estimation apparatus 110 may generate the fourth image fusion attention feature map 660 of the first image by fusing the column relationship information of the second image with the third image attention feature map 570 of the first image.

According to an embodiment, the optical flow estimation apparatus 110 may obtain a second column vector-feature map by concatenating the second column vector 610 and the third image attention feature map 570 of the first image. The optical flow estimation apparatus 110 may obtain the fourth image fusion attention feature map 660 of the first image through the fourth multi-head attention module 600 based on the second column vector-feature map. The fourth image fusion attention feature map 660 of the first image may further include column relationship information of the second image.

According to an embodiment, the optical flow estimation apparatus 110 may obtain a query, a key, and a value by inputting the second column vector-feature map into linear layers (e.g., first linear layer 615-1, second linear layer 615-3, and third linear layer 615-5, hereinafter "615" generally), respectively. The optical flow estimation apparatus 110 may obtain a query, a key, and a value with predetermined dimensions by reshaping the query, the key, and the value using reshaping layers (e.g., first reshaping layer 620-1, second reshaping layer 620-3, and third reshaping layer 620-5, hereinafter "620" generally), respectively. The optical flow estimation apparatus 110 may generate a height-axial attention feature map 625 by performing cross-multiplication on the query with predetermined dimensions and the key with predetermined dimensions. The optical flow estimation apparatus 110 may obtain a fourth vector feature map of the first image by performing cross-multiplication on the height-axial attention feature map 625 and the value with predetermined dimensions.

According to an embodiment, the optical flow estimation apparatus 110 may separate the fourth vector feature map of the first image into a second height-axially separated attention feature map 630 of the first image and second column information map 635.

According to an embodiment, the optical flow estimation apparatus 110 may linearly project the second column information map 635 through linear layers (e.g., first linear layer 640-1 and second linear layer 640-3, hereinafter "640" generally). The optical flow estimation apparatus 110 may use the output results of the first and second linear layers 640-1 and 640-3 as the query and the key, respectively. The optical flow estimation apparatus 110 may obtain the second column relationship information map 645 of the first image by performing cross-multiplication on the query (e.g., the output result of the first linear layer 640-1) and the key (e.g., the output result of the second linear layer 640-3).

According to an embodiment, the optical flow estimation apparatus 110 may perform cross-multiplication on the second column relationship information map 645 of the first image and the second height-axially separated attention feature map 630. The optical flow estimation apparatus 110 may obtain the fourth image fusion attention feature map 660 of the first image through a linear layer 650 and a layer normalization layer 655 based on the cross-multiplication result. The linear layer 650 may be and/or may include a cascaded linear layer.

According to an embodiment, the optical flow estimation apparatus 110 may obtain the fourth image attention feature map 670 of the first image based on the fourth image fusion attention feature map 660 of the first image and the third image attention feature map 570 of the first image. For example, the optical flow estimation apparatus 110 may obtain the fourth image attention feature map 670 by adding the fourth image fusion attention feature map 660 of the first image and the third image attention feature map 570 of the first image. As another example, the optical flow estimation apparatus 110 may input the result of adding the fourth image fusion attention feature map 660 of the first image and the third image attention feature map 570 of the first image into an FFN 665. In an embodiment, the output of the FFN 665 may be used as the fourth image attention feature map.

The operation of obtaining the fourth image attention feature map 670 of the second image may be substantially similar and/or the same as the operation of obtaining the third image attention feature map 570 of the first image, and thus, repeated description thereof is omitted for the sake of brevity.

According to an embodiment, the optical flow estimation apparatus 110 may potentially eliminate and/or reduce the impact of axial separation by performing an attention operation for axial separation and a subsequent learnable cross-row (e.g., column) fusion. The optical flow estimation apparatus 110 may obtain potentially better global information, when compared to related optical flow estimation techniques, by additionally fusing information between different rows (or columns) of horizontal (or vertical) attention. The optical flow estimation apparatus 110 may fuse information (e.g., row relationship information and column relationship information) of two frame images of an optical flow using a cross-attention mechanism, thereby further improving the accuracy of optical flow prediction.

FIG. 7 illustrates an example of an operation of estimating an optical flow according to an embodiment.

Referring to FIG. 7, according to an embodiment, the optical flow estimation apparatus 110 may generate a plurality of first clusters including features of a first image feature map representing a first image by clustering the first image feature map. The optical flow estimation apparatus 110 may randomly obtain center features of the plurality of clusters from an image feature map F1 705 (e.g., a second image attention feature map $X^v$ 465 of the first image, a fourth image attention feature map of the first image, or an image feature map of the first image). For example, the optical flow estimation apparatus 110 may randomly select several features (and/or pixels) from the image feature map 705 and use the selected features as the center features of the clusters.

According to an embodiment, the optical flow estimation apparatus 110 may obtain the center features of the clusters through a cluster-transformer 715. The cluster-transformer 715 may include a cluster-attention module 715-1, a multi-head attention module 715-3, and an FFN module 715-5.

The cluster-attention module 715-1 may update the center features of the clusters in the image feature map F1 705. The cluster-attention module 715-1 may update the center features by performing a cluster-attention operation based on a cluster-attention mechanism. The cluster-attention module 715-1 may include a plurality of linear modules (e.g., first linear module 716-1, second linear module 716-2, and third linear module 716-3, hereinafter "716" generally) and at least one cluster-wise Gumbel-Softmax module 717.

The cluster-transformer 715 may repeatedly (e.g., one or more times) perform the update operation to obtain the center feature of the final cluster.

According to an embodiment, the optical flow estimation apparatus 110 may perform point multiplication on the image feature map F1 705 and the output of the cluster-transformer 715. The optical flow estimation apparatus 110 may obtain a pixel in a cluster corresponding to the center feature of each cluster based on the point multiplication result. The optical flow estimation apparatus 110 may perform a cluster-wise Gumbel-Softmax operation 718-2 on the point multiplication result. The optical flow estimation apparatus 110 may perform a differentiable top-1 operation 719-2 on the point multiplication result. The optical flow estimation apparatus 110 may obtain the pixel in the cluster corresponding to the center feature of each cluster based on the operation results (e.g., the Softmax operation result and the top-1 operation result). The optical flow estimation apparatus 110 may generate first clusters 750 through hard feature grouping of the image feature map F1 705 based on the pixel in the cluster (e.g., the pixel in the cluster corresponding to the center feature of each cluster).

According to an embodiment, the optical flow estimation apparatus 110 may perform point multiplication on the output of the cluster-transformer 715 and an image feature map F2 710 (e.g., a second attention feature map $X^v$ 465 of the second image, a fourth attention feature map of the second image, or a feature map of the second image). The optical flow estimation apparatus 110 may determine, based on the point multiplication result, a pixel 730 in the second image that is most associated with the cluster corresponding to the center feature of each final cluster (e.g., the center feature among the features respectively included in the first clusters) through a spatial-wise Softmax operation 718-1 and a differentiable top-k operation 719-1, where k is a positive integer greater than zero (0). For example, the optical flow estimation apparatus 110 may perform the differentiable top-k operation through a perturbation optimizer.

According to an embodiment, the optical flow estimation apparatus 110 may obtain a loss matrix (e.g., the cost volume 770) based on the first clusters 750 and the pixel 730 in the second image. For example, the optical flow estimation apparatus 110 may perform point multiplication 720 on the center feature of each of the first clusters 750 and the pixel 730 in the second image corresponding to each cluster. The optical flow estimation apparatus 110 may obtain the loss matrix (e.g., the cost volume 770) based on the point multiplication result.

According to an embodiment, the optical flow estimation apparatus 110 may estimate the optical flow 790 of the first image and the second image based on the loss matrix (e.g., the cost volume 770).

According to an embodiment, the optical flow estimation apparatus 110 may calculate the loss matrix (e.g., the cost volume 770) by obtaining a plurality of pixels most associated with each set of the image feature map F1 705 in the global scope of the image feature map F2 710. As a result, the accuracy and computation efficiency of the optical flow estimation apparatus 110 may increase.

Figure 8:
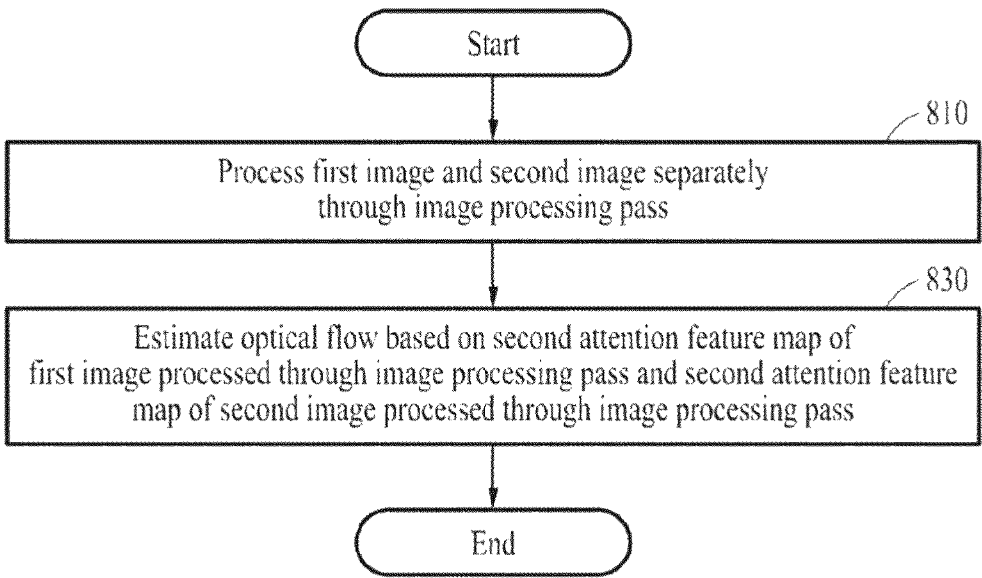
FIG. 8 is a flowchart illustrating an optical flow estimation method, according to an embodiment.

FIG. 8 is a flowchart illustrating an optical flow estimation method, according to an embodiment.

Referring to FIG. 8, operations 810 through 830 may be performed sequentially. However, the present disclosure is not limited in this regard. That is, operations 810 through 830 may not be necessarily performed sequentially. For example, operations 810 to 830 may be performed in a different order, and/or at least two operations thereof may be performed in parallel. Operations 810 to 830 may be substantially similar and/or the same as the operation of the optical flow estimation apparatus (e.g., the optical flow estimation apparatus 110 of FIG. 1 and/or the optical flow estimation apparatus 210 of FIG. 2) described with reference to FIGS. 1 to 7. Accordingly, repeated description thereof may be omitted for the sake of brevity.

In operation 810, the optical flow estimation apparatus 110 may process a first image and a second image separately through an image processing pass.

In operation 830, the optical flow estimation apparatus 110 may estimate an optical flow based on a second image attention feature map $X^v$ 465 of the first image processed through the image processing pass and a second image attention feature map $X^v$ 465 of the second image processed through the image processing pass.

Figure 9:
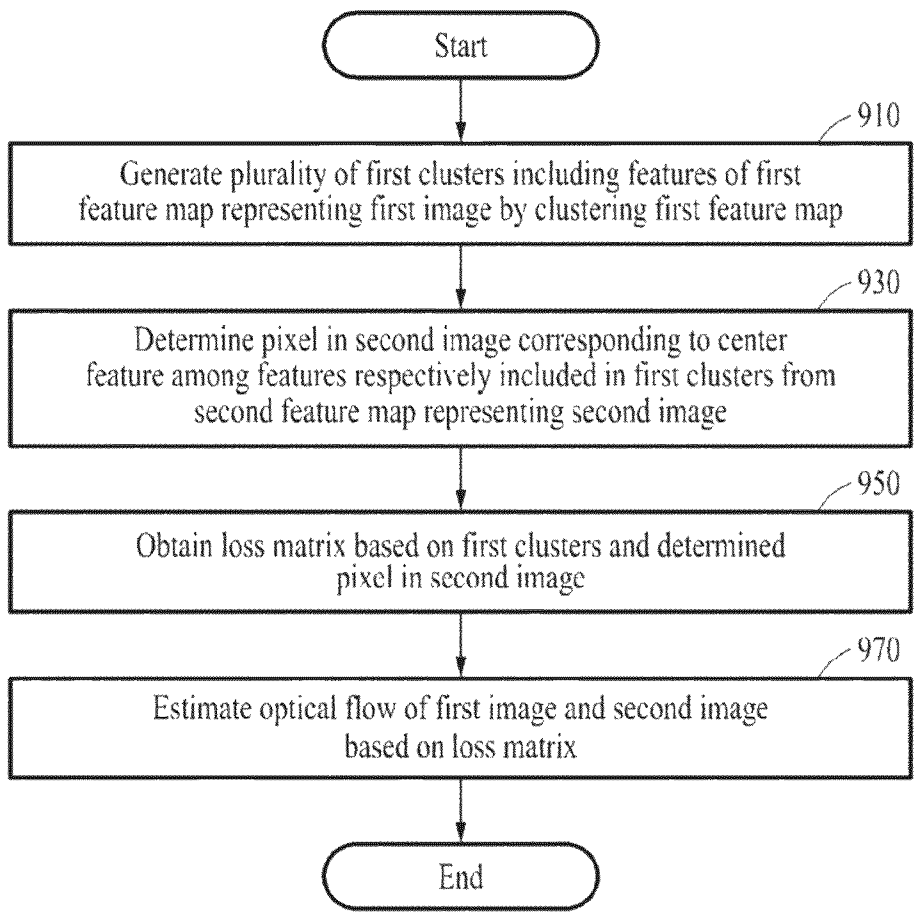
FIG. 9 is a flowchart illustrating an optical flow estimation method, according to another embodiment.

FIG. 9 is a flowchart illustrating an optical flow estimation method, according to another embodiment.

Referring to FIG. 9, operations 910 through 970 may be performed sequentially. However, the present disclosure is not limited in this regard. That is, operations 910 through 970 may not be necessarily performed sequentially. For example, operations 910 through 970 may be performed in a different order, and/or at least two operations thereof may be performed in parallel. Operations 910 through 970 may be substantially similar and/or the same as the operation of the optical flow estimation apparatus (e.g., the optical flow estimation apparatus 110 of FIG. 1 and/or the optical flow estimation apparatus 210 of FIG. 2) described with reference to FIGS. 1 to 8. Accordingly, a repeated description thereof may be omitted for the sake of brevity.

In operation 910, the optical flow estimation apparatus 210 may generate a plurality of first clusters (e.g., first clusters 750 of FIG. 7) including features of a first image feature map (e.g., image feature map F1 705 of FIG. 7) representing a first image by clustering the first feature map F1 705.

In operation 930, the optical flow estimation apparatus 210 may determine a pixel (e.g., pixel 730 of FIG. 7) in a second image corresponding to a center feature among the features respectively included in the first clusters 750 from a second image feature map (e.g., image feature map F2 710 of FIG. 7) representing the second image.

In operation 950, the optical flow estimation apparatus 210 may obtain a loss matrix (e.g., the cost volume 770 of FIG. 7) based on the first clusters 750 and the determined pixel 730 in the second image.

In operation 970, the optical flow estimation apparatus 210 may estimate an optical flow (e.g., the optical flow 790 of FIG. 7) of the first image and the second image based on the loss matrix (e.g., the cost volume 770).

Figure 10:
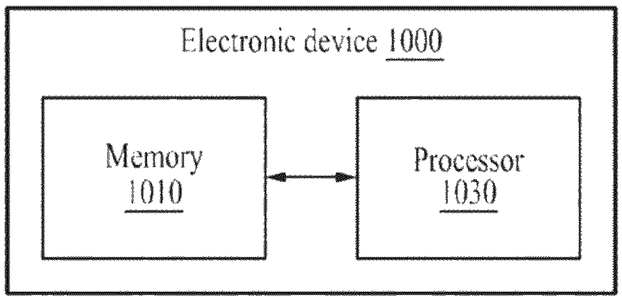
FIG. 10 illustrates an example of an electronic device, according to an embodiment.

FIG. 10 illustrates an example of an electronic device, according to an embodiment.

Referring to FIG. 10, an electronic device 1000 may include a memory 1010 and a processor 1030. The electronic device 1000 may include the optical flow estimation apparatus 110 of FIG. 1 and/or the optical flow estimation apparatus 210 of FIG. 2.

The memory 1010 may store instructions (and/or programs) executable by the processor 1030. For example, the instructions may include instructions for performing an operation of the processor 1030 and/or an operation of each component of the processor 1030.

The memory 1010 may be implemented as a volatile memory device or a non-volatile memory device.

The volatile memory device may be implemented as at least one of a dynamic random-access memory (DRAM), a static random-access memory (SRAM), a thyristor RAM (T-RAM), a zero capacitor RAM (Z-RAM), a twin transistor RAM (TTRAM), or the like, and/or a combination thereof. However, the present disclosure is not limited in this regard, and the volatile memory device may be implemented using other types of volatile memory devices than the ones listed above.

The non-volatile memory device may be implemented as at least one of an electrically erasable programmable read-only memory (EEPROM), a flash memory, a magnetic RAM (MRAM), a spin-transfer torque (STT)-MRAM, a conductive bridging RAM (CBRAM), a ferroelectric RAM (Fe-RAM), a phase change RAM (PRAM), a resistive RAM (RRAM), a nanotube RRAM, a polymer RAM (PoRAM), a nano floating gate Memory (NFGM), a holographic memory, a molecular electronic memory device, an insulator resistance change memory, or the like, and/or a combination thereof. However, the present disclosure is not limited in this regard, and the non-volatile memory device may be implemented using other types of non-volatile memory devices than the ones listed above.

The processor 1030 may process data stored in the memory 1010. The processor 1030 may execute computer-readable code (e.g., software) stored in the memory 1010 and instructions triggered by the processor 1030.

The processor 1030 may be a data processing device implemented by hardware including a circuit having a physical structure to perform desired operations. For example, the desired operations may include code or instructions included in a program.

For example, the hardware-implemented data processing device may be and/or may include, but not be limited to, a microprocessor, a central processing unit (CPU), a processor core, a multi-core processor, a multiprocessor, an application-specific integrated circuit (ASIC), and a field-programmable gate array (FPGA).

The optical flow estimation apparatus 110 of FIG. 1 and/or the optical flow estimation apparatus 210 of FIG. 2 may be stored in the memory 1010 and executed by the processor 1030 or embedded in the processor 1030. The processor 1030 may perform the operation of the optical flow estimation apparatus 110 and/or the optical flow estimation apparatus 210 described with reference to FIGS. 1 to 9 in substantially the same manner. Accordingly, repeated description thereof is omitted for the sake of brevity.

While the present disclosure has been described with reference to illustrative embodiments, this description is not intended to be construed in a limiting sense. Various modifications and combinations of the illustrative embodiments, as well as other embodiments of the invention, may be apparent to persons skilled in the art upon reference to the description. It is therefore intended that the appended claims encompass any such modifications or embodiments.

What is claimed is:

1. A method of estimating an optical flow, the method comprising:

processing, using an image processing pass, a first image and a second image separately; and estimating the optical flow based on a second image attention feature map of the first image processed using the image processing pass and a second image attention feature map of the second image processed using the image processing pass, wherein the processing of an image using the image processing pass comprises:

extracting an image feature map of the image by encoding the image;

outputting a first image fusion attention feature map by fusing image width-axial row relationship information of the image with the image feature map;

outputting a first image attention feature map of the image based on the first image fusion attention feature map and the image feature map;

outputting a second image fusion attention feature map by fusing image height-axial column relationship information of the image with the first image attention feature map including the image width-axial row relationship information; and generating a second image attention feature map of the image by adding the second image fusion attention feature map and the first image attention feature map.

2. The method of claim 1, wherein the estimating of the optical flow comprises:

generating a third image fusion attention feature map of the first image by fusing second row relationship information of the second image with the second image attention feature map of the first image based on the second image attention feature map of the first image and an image feature map of the second image;

obtaining a third image attention feature map of the first image based on the third image fusion attention feature map of the first image and the second image attention feature map of the first image;

generating a fourth image fusion attention feature map of the first image by fusing second column relationship information of the second image with the third image attention feature map; and obtaining a fourth image attention feature map of the first image based on the fourth image fusion attention feature map of the first image and the third image attention feature map of the first image.

3. The method of claim 2, wherein the estimating of the optical flow further comprises:

generating a third image fusion attention feature map of the second image by fusing first row relationship information of the first image with the second image attention feature map of the second image based on the second image attention feature map of the second image and an image feature map of the first image;

obtaining a third image attention feature map of the second image based on the third image fusion attention feature map of the second image and the second image attention feature map of the second image;

generating a fourth image fusion attention feature map of the second image by fusing first column relationship information of the first image with the third image attention feature map; and obtaining a fourth image attention feature map of the second image based on the fourth image fusion attention feature map of the second image and the third image attention feature map of the second image.

4. The method of claim 3, wherein the estimating of the optical flow further comprises estimating the optical flow based on the fourth image attention feature map of the first image and the fourth image attention feature map of the second image.

5. The method of claim 1, wherein the processing of the image using the image processing pass further comprises:

concatenating a row vector for extracting the image width-axial row relationship information with the image feature map of the image;

obtaining a first vector feature map of the image based on the image feature map of the image concatenated with the row vector, wherein the first vector feature map is width-axially separated and attention-learnable;

separating the first vector feature map into a width-axially separated feature map of the image and a first information map corresponding to the image width axial row relationship information; and generating the first image fusion attention feature map based on the width-axially separated feature map of the image and the first information map.

6. The method of claim 1, wherein the processing of the image using the image processing pass further comprises:

concatenating a column vector for extracting the image height axial column relationship information with the first image attention feature map of the image;

obtaining a second vector feature map of the image based on the first image attention feature map of the image concatenated with the column vector, wherein the second vector feature map is height-axially separated and attention-learnable;

separating the second vector feature map into a height-axially separated feature map of the image and a second information map corresponding to the image height axial column relationship information; and generating the second image fusion attention feature map based on the height-axially separated feature map of the image and the second information map.

7. An apparatus for estimating an optical flow, comprising:

a memory configured to store one or more instructions; and a processor communicatively coupled to the memory, wherein the processor is configured to execute the one or more instructions to:

process, using an image processing pass, a first image and a second image separately; and estimate the optical flow based on a second image attention feature map of the first image obtained using the image processing pass and a second image attention feature map of the second image obtained using the image processing pass, wherein the image processing pass is configured to:

extract an image feature map of an image by encoding the image;

output a first image fusion attention feature map by fusing image width-axial row relationship information of the image with the image feature map;

output a first image attention feature map of the image based on the first image fusion attention feature map and the image feature map;

output a second image fusion attention feature map by fusing image height-axial column relationship information of the image with the first image attention feature map including the image width-axial row relationship information; and generate a second image attention feature map of the image by adding the second image fusion attention feature map and the first image attention feature map.

8. The apparatus of claim 7, wherein the processor is further configured to execute the one or more instructions to:

generate a third image fusion attention feature map of the first image by fusing second row relationship information of the second image with the second image attention feature map of the first image based on the second image attention feature map of the first image and an image feature map of the second image;

obtain a third image attention feature map of the first image based on the third image fusion attention feature map of the first image and the second image attention feature map of the first image;

generate a fourth image fusion attention feature map of the first image by fusing second column relationship information of the second image with the third image attention feature map; and obtain a fourth image attention feature map of the first image based on the fourth image fusion attention feature map of the first image and the third image attention feature map of the first image.

9. The apparatus of claim 8, wherein the processor is further configured to execute the one or more instructions to:

generate a third image fusion attention feature map of the second image by fusing first row relationship information of the first image with the second image attention feature map of the second image based on the second image attention feature map of the second image and an image feature map of the first image;

obtain a third image attention feature map of the second image based on the third image fusion attention feature map of the second image and the second image attention feature map of the second image;

generate a fourth image fusion attention feature map of the second image by fusing first column relationship information of the first image with the third image attention feature map; and obtain a fourth image attention feature map of the second image based on the fourth image fusion attention feature map of the second image and the third image attention feature map of the second image.

10. The apparatus of claim 9, wherein the processor is further configured to execute the one or more instructions to estimate the optical flow based on the fourth image attention feature map of the first image and the fourth image attention feature map of the second image.

11. The apparatus of claim 7, wherein the image processing pass is further configured to:

concatenate a row vector for extracting the image width-axial row relationship information with the image feature map of the image;

obtain a first vector feature map of the image based on the image feature map of the image concatenated with the row vector, wherein the first vector feature map is width-axially separated and attention-learnable;

separate the first vector feature map into a width-axially separated feature map of the image and a first information map corresponding to the image width axial row relationship information; and generate the first image fusion attention feature map based on the width-axially separated feature map of the image and the first information map.

12. The apparatus of claim 7, wherein the image processing pass is further configured to:

concatenate a column vector for extracting the image height axial column relationship information with the first image attention feature map of the image;

obtain a second vector feature map of the image based on the first image attention feature map of the image concatenated with the column vector, wherein the second vector feature map is height-axially separated and attention-learnable;

separate the second vector feature map into a height-axially separated feature map of the image and a second information map corresponding to the image height axial column relationship information; and generate the second image fusion attention feature map based on the height-axially separated feature map of the image and the second information map.

13. A method of estimating an optical flow, the method comprising:

generating a plurality of first clusters comprising features of a first image feature map representing a first image by clustering the first image feature map;

determining a pixel in a second image corresponding to a center feature from among the features respectively included in the plurality of first clusters from a second image feature map representing the second image, wherein the second image feature map is obtained by outputting a first image fusion attention feature map by fusing an image width-axial row relationship information of the first image with the first image feature map;

outputting a first image attention feature map of the first image based on the first image fusion attention feature map and the first image feature map;

outputting a second image fusion attention feature map by fusing image height-axial column relationship information of the first image with the first image attention feature map including the image width-axial row relationship information; and generating, as the second image feature map, a second image attention feature map of the first image by adding the second image fusion attention feature map and the first image attention feature map;

obtaining a loss matrix based on the plurality of first clusters and the determined pixel in the second image; and estimating the optical flow of the first image and the second image based on the loss matrix.

14. The method of claim 13, wherein the generating of the plurality of first clusters comprises:

dividing the features of the first image feature map of the first image into a plurality of subsets; and dividing the features of the first image feature map of the first image into the plurality of first clusters.

15. The method of claim 13, wherein the determining of the pixel in the second image comprises:

determining one or more features most associated with the center feature of each cluster among the plurality of first clusters in an image feature matrix of the second image.

16. The method of claim 13, wherein the obtaining of the loss matrix comprises calculating a correlation between the center feature and the pixel in the second image.

17. An apparatus for estimating an optical flow, comprising:

a memory configured to store one or more instructions; and a processor communicatively coupled to the memory, wherein the processor is configured to execute the one or more instructions to:

generate a plurality of first clusters comprising features of a first feature map representing a first image by clustering the first feature map;

determine a pixel in a second image corresponding to a center feature from among the features respectively included in the plurality of first clusters from a second feature map representing the second image, wherein the second image feature map is obtained by outputting a first image fusion attention feature map by fusing an image width-axial row relationship information of the first image with the first image feature map;

outputting a first image attention feature map of the first image by using the first image fusion attention feature map and the first image feature map as inputs for the second process;

outputting a second image fusion attention feature map by fusing image height-axial column relationship information of the first image with the first image attention feature map including the image width-axial row relationship information; and generating, as the second image feature map, a second image attention feature map of the first image by adding the second image fusion attention feature map and the first image attention feature map as inputs for the fourth process;

obtain a loss matrix based on the plurality of first clusters and the determined pixel in the second image; and estimate the optical flow of the first image and the second image based on the loss matrix.

18. The apparatus of claim 17, wherein the processor is further configured to execute the one or more instructions to:

divide the features of the first feature map of the first image into a plurality of subsets; and divide the features of the first feature map of the first image into the plurality of first clusters.

19. The apparatus of claim 17, wherein the processor is further configured to execute the one or more instructions to:

determine one or more features most associated with the center feature of each cluster among the plurality of first clusters in an image feature matrix of the second image.

20. The apparatus of claim 17, wherein the processor is further configured to execute the one or more instructions to:

calculate a correlation between the center feature and the pixel in the second image.

* * * * *